US010353979B2

(12) United States Patent
Lin

(10) Patent No.: US 10,353,979 B2
(45) Date of Patent: Jul. 16, 2019

(54) WEB-USER NAVIGATING INFORMATION RECORDING METHOD, APPARATUS AND STORAGE MEDIUM

(71) Applicant: Tencent Technology (Shenzhen) Company Limited, Shenzhen (CN)

(72) Inventor: Xiaodan Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 939 days.

(21) Appl. No.: 14/300,967

(22) Filed: Jun. 10, 2014

(65) Prior Publication Data

US 2014/0325340 A1 Oct. 30, 2014

Related U.S. Application Data

(63) Continuation of application No. PCT/CN2014/073798, filed on Mar. 20, 2014.

(30) Foreign Application Priority Data

Apr. 25, 2013 (CN) .......................... 2013 1 0148408

(51) Int. Cl.
G06F 16/954 (2019.01)
G06F 16/957 (2019.01)
G06F 16/955 (2019.01)

(52) U.S. Cl.
CPC .......... *G06F 16/957* (2019.01); *G06F 16/954* (2019.01); *G06F 16/9562* (2019.01); *G06F 16/9577* (2019.01)

(58) Field of Classification Search
CPC ................. G06F 17/24; G06F 17/2247; G06F 17/30905; G06F 17/30884; G06F 17/3089;
(Continued)

(56) References Cited

U.S. PATENT DOCUMENTS 5,917,491 A * 6/1999 Bauersfeld ............ G06F 3/0483
707/E17.013
6,272,484 B1 * 8/2001 Martin ............... G06F 17/30884
(Continued)

FOREIGN PATENT DOCUMENTS

CN 101202754 A 6/2008
CN 102073559 A 5/2011
(Continued)

OTHER PUBLICATIONS

PCT Search Report for PCT/CN2014/073798, dated Jun. 30, 2014.
(Continued)

*Primary Examiner* — Thu V Huynh
(74) *Attorney, Agent, or Firm* — Brinks Gilson & Lione

(57) ABSTRACT

The present application provides an information recording method, apparatus, browser and electronic device. The method includes: displaying a quick navigation item on the browser; receiving a trigger signal acting on the quick navigation item; after receiving the trigger signal, opening the preset webpage file according to the file save path corresponding to the quick navigation item; recording information in the editable region of the preset webpage file opened. By opening a corresponding preset webpage file using the quick navigation item corresponding to the file save path, a user can record information in the preset webpage file. Since the preset webpage file does not need to be logged into by connecting to a server via a network, notes can be made using the preset webpage file when offline and since a large amount of content is recorded in the preset webpage file, time and traffic can be saved.

5 Claims, 5 Drawing Sheets

(58) Field of Classification Search
CPC ......... G06F 17/30876; G06F 17/30873; G06F 17/30899; G06F 16/957; G06F 16/954; G06F 16/9577; G06F 16/9562
See application file for complete search history.

(56) References Cited

U.S. PATENT DOCUMENTS

| | | | | |
|---|---|---|---|---|
| 6,427,175 | B1* | 7/2002 | Khan | G06F 17/30884 707/E17.114 |
| 6,460,038 | B1* | 10/2002 | Khan | G06F 17/30884 |
| 6,546,393 | B1* | 4/2003 | Khan | G06F 17/30884 |
| 7,325,197 | B1* | 1/2008 | Massena | G06F 17/3089 715/209 |
| 7,899,829 | B1* | 3/2011 | Malla | G06F 17/30884 707/741 |
| 8,433,995 | B1* | 4/2013 | Karam | G06F 17/30884 715/206 |
| 2006/0136576 | A1* | 6/2006 | Ookuma | G06F 21/31 709/219 |
| 2007/0011130 | A1 | 1/2007 | Yamabuchi | |
| 2008/0059906 | A1* | 3/2008 | Toki | G11B 27/34 715/810 |
| 2008/0313206 | A1* | 12/2008 | Kordun | G06F 17/30884 |
| 2009/0077124 | A1* | 3/2009 | Spivack | G06Q 30/02 |
| 2009/0228504 | A1* | 9/2009 | Brown | G06F 17/30884 |
| 2010/0122162 | A1* | 5/2010 | Terada | G06F 1/1626 715/702 |
| 2010/0268704 | A1* | 10/2010 | Chou | G06F 17/30675 707/723 |
| 2012/0209957 | A1* | 8/2012 | Schneider | G06F 17/30884 709/217 |
| 2014/0259008 | A1* | 9/2014 | Bhattiprolu | G06F 8/61 717/174 |
| 2014/0337404 | A1* | 11/2014 | Jitkoff | G06F 17/30884 709/203 |
| 2015/0293891 | A1* | 10/2015 | Watal | G06F 17/30884 715/230 |

FOREIGN PATENT DOCUMENTS

| | | |
|---|---|---|
| CN | 102446175 A | 5/2012 |
| CN | 103020191 A | 4/2013 |
| CN | 103023972 A | 4/2013 |
| CN | 103024010 A | 4/2013 |

OTHER PUBLICATIONS

Wang, Laijian, "Easy and Convenient Network Notepad," with Translation, Computer Knowledge and Technology, Jan. 31, 2007, No. 1, p. 65.

Office Action issued in Chinese Application No. 201310148408.9 with Translation dated Nov. 7, 2017.

* cited by examiner

WEB-USER NAVIGATING INFORMATION RECORDING METHOD, APPARATUS AND STORAGE MEDIUM

CROSS-REFERENCE TO RELATED APPLICATIONS

This application is a U.S. continuation application under 35 U.S.C. § 111(a) claiming priority under 35 U.S.C. §§ 120 and 365(c) to International Application PCT/CN2014/073798 filed Mar. 20, 2014 which claims the priority benefit of Chinese Patent Application No.2013101484089 filed Apr. 25, 2013, the contents of which are incorporated by reference herein in their entirety for all intended purposes.

FILED OF INVENTION

The present disclosure relates to computer technical field, and particularly, relates to information recording method, apparatus, browser and electronic device.

BACKGROUND

In order for a user to be ready to record relevant information being browsed when browsing a webpage with a browser, most prior browsers provide a network notepad function, with which the user may record contents such as his/her webpage reading progress, everyday study plan, etc.

At present, an information recording method exists which includes: a web-version network notepad can be connected via a browser, if a user wishes to use the network notepad, first, he/she needs to input login information on a login page provided by the network notepad and send the login information to a server corresponding to the network notepad, then the server corresponding to the network notepad verifies the login information received and allows the user to log into the network notepad only if the verification is successful; when logging into the network notepad successfully, the user can record information in the network notepad under the situation in which the network is connected, i.e., the network notepad is connected to the server.

When implementing the present disclosure, the inventor finds that the above method has at least the following problem: for an electronic device using a mobile network, when a user is using a network notepad of a browser in the electronic device, he/she needs to log into the network notepad through a server corresponding to the network notepad under the situation in which the browser is connected to the network first and then make notes using the network notepad under the situation in which the network is connected. Since data transmission rate of the mobile network is relatively slow and transmission fee is relatively high at present, if a user needs to make notes by the network notepad frequently and record a great quantity of contents, it will take a relatively long time and waste large amounts of traffic to record information by means of the network notepad.

SUMMARY OF INVENTION

This section provides a general summary of the disclosure, and is not a comprehensive disclosure of its full scope or all of its features.

According to various embodiments of the present disclosure, there is provided an information recording method, apparatus, browser and electronic device, the technical solutions are as follows.

The first aspect provides an information recording method, which is applied in an electronic device containing a browser and characterized in that, the method includes:
  displaying a quick navigation item on the browser, the quick navigation item corresponding to a file save path of a preset webpage file stored in the electronic device;
  receiving a trigger signal acting on the quick navigation item;
  after receiving the trigger signal, opening the preset webpage file according to the file save path corresponding to the quick navigation item, the preset webpage file containing an editable region;
  recording information in the editable region of the preset webpage file opened.

The second aspect provides an information recording apparatus, which is applied in an electronic device containing a browser and characterized in that, the apparatus includes:
  a display module for displaying a quick navigation item on the browser, the quick navigation item corresponding to a file save path of a preset webpage file stored in the electronic device;
  a trigger signal receiving module for receiving a trigger signal acting on the quick navigation item displayed by the display module;
  an opening module for opening the preset webpage file according to the file save path corresponding to the quick navigation item after the trigger signal receiving module receives the trigger signal, the preset webpage file containing an editable region;
  a recording module for recording information in the editable region of the preset webpage file opened by the opening module.

The third aspect provides a browser, which includes an information recording apparatus provided by the second aspect.

The fourth aspect provides an electronic device, which includes a browser provided by the third aspect.

The fifth aspect provides a non-transitory computer-readable storage medium storing one or more sequence of instructions which, when executed by one or more processors, cause the one or more processors to: display a quick navigation item on the browser, the quick navigation item corresponding to a file save path of a preset webpage file stored in the electronic device; receive a trigger signal acting on the quick navigation item; after receiving the trigger signal, open the preset webpage file according to the file save path corresponding to the quick navigation item, the preset webpage file containing an editable region; and record information in the editable region of the preset webpage file opened.

Beneficial effects brought by the technical solutions provided by embodiments of the present disclosure at least include:

A preset webpage file in an installation package is stored to a predefined file save path when installing a browser, and when notes need to be made by means of the preset webpage file, only the preset webpage file needs to be opened via the file save path, and then a user can record information in the preset webpage file. Since the preset webpage file does not need to be logged into by connecting to a server via a network, notes can be made by means of the preset webpage file even in the state of offline, and when a great quantity of contents are recorded in the preset webpage file, time and traffic can be saved to a large extent.

BRIEF DESCRIPTION OF THE DRAWINGS

In order to describe technical solutions in the embodiments of the present disclosure more clearly, accompany drawings needed in describing the embodiments or prior arts will be introduced briefly as below. Needless to say, the accompany drawings in the following description only illustrate some embodiments of the present disclosure, and according to these drawings, other drawings can be obtained without paying creative work for those ordinary skilled in the art.

DESCRIPTION OF EXAMPLE EMBODIMENTS

In order to make the object, technical solutions and advantages of the present disclosure more clear, implementation of the present disclosure will further be described in combination with accompany drawings in detail as below.

Term "electronic device" described herein may include, but is not limited to, one of terminals such as mobile phone, tablet computer, notebook, digital camera, desktop computer, multimedia television, etc.

Figure 1:
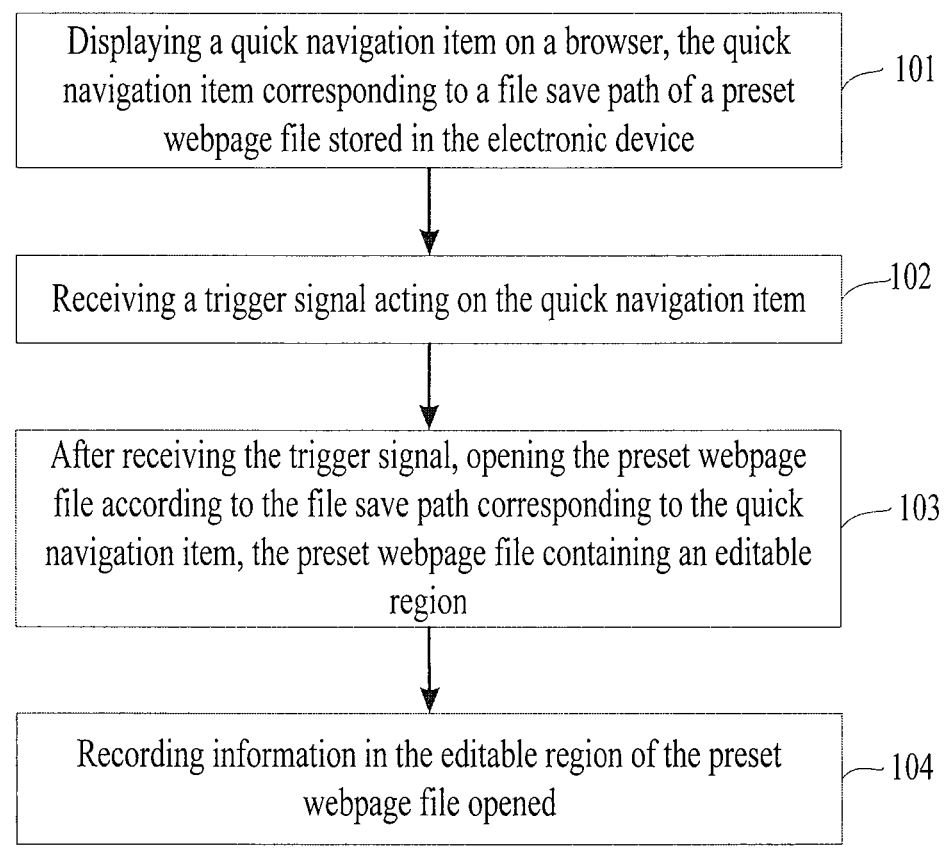
FIG. 1 is a flow chart of the information recording method provided by one embodiment of the present disclosure.

Refer to FIG. 1, which shows a flow chart of the information recording method provided by the one embodiment of the present disclosure. The information recording method may be applied in an electronic device containing a browser and may include:

Step 101, displaying a quick navigation item on the browser, the quick navigation item corresponding to a file save path of a preset webpage file stored in the electronic device.

Quick navigation item usually includes, but is not limited to one of icon, label, bookmark, menu item, button and hyperlink which are set in the browser.

Step 102, receiving a trigger signal acting on the quick navigation item.

When a user selects the quick navigation item via a touch operation or a button in the electronic device, a trigger signal can be produced, at which time, the browser will receive a trigger signal acting on the quick navigation item. Obviously, the trigger signal may include information on the file save path corresponding to the quick navigation item.

Step 103, after receiving the trigger signal, opening the preset webpage file according to the file save path corresponding to the quick navigation item, the preset webpage file containing an editable region.

Step 104, recording information in the editable region of the preset webpage file opened.

The user may input information in the editable region of the preset webpage file opened. Accordingly, the browser may record the information input by the user in the editable region of the preset webpage file opened.

From the above, with the information recording method provided by the embodiment of the present disclosure, by only opening a corresponding preset webpage file by means of the quick navigation item corresponding to the file save path, a user can record information in the preset webpage file. Since the preset webpage file does not need to be logged into by connecting to a server via a network, notes can be made by means of the preset webpage file even in the state of offline, and when a great quantity of contents are recorded in the preset webpage file, time and traffic can be saved to a large extent.

Figure 2:
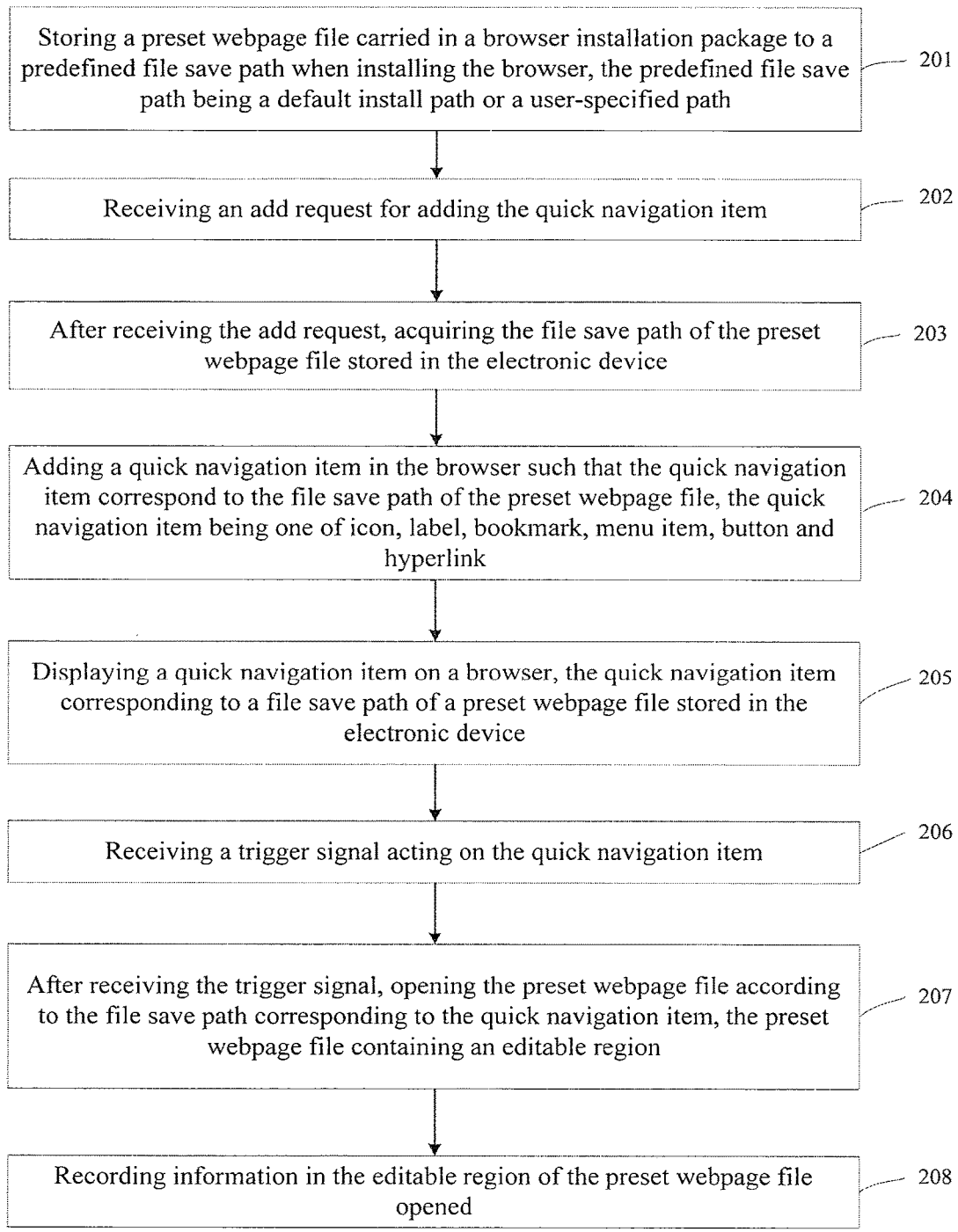
FIG. 2 is a flow chart of the information recording method provided by another embodiment of the present disclosure.

Refer to FIG. 2, which shows a flow chart of the information recording method provided by another embodiment of the present disclosure. The information recording method may be applied in an electronic device containing a browser and may include:

Step 201, when installing the browser, storing a preset webpage file carried in a browser installation package to a predefined file save path, the predefined file save path being a default install path or a user-specified path.

Specifically, when implementing the disclosure, the preset webpage file can be packed into a browser installation package, the preset webpage file is typically a webpage file constructed in HTML (Hyper Text Markup Language) or other languages which can be parsed into a webpage by the browser.

After packing the preset webpage file into the browser installation package, while the browser is installed via the browser installation package, the preset webpage file in the installation package may be stored in a default manner or in a manner set by user himself/herself. That is to say, in the process of installing the browser, the preset webpage file may be stored to a predefined file save path, which may be either a default install path or a user-specified path.

It is important to note that, according to the physical concept of file save path, each file has a different file save path; in other words, each file save path uniquely specifies a file.

Step 202, receiving an add request for adding a quick navigation item.

In order for a user to open the preset webpage file directly via the browser, a quick navigation item may usually be set for the preset webpage file in the browser.

Specifically, when implementing the disclosure, a quick navigation item may be added by means of an add button or an add shortcut key in the browser. For example, an add button or an add shortcut key may be set on the homepage of the browser, and a user may operate the add button or the add shortcut key displayed on the homepage of the browser in the form of pressing a button or touching a screen. Accordingly, the browser will receive an add request for adding a quick navigation item.

Figure 3:
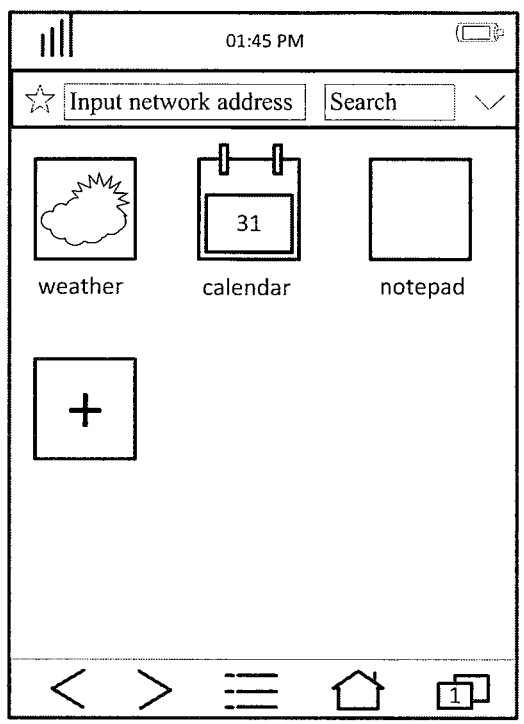
FIG. 3 is a schematic diagram of a browser which can display quick navigation items provided in one embodiment of the present disclosure.

Refer to FIG. 3, which shows a schematic diagram of a browser which can display quick navigation items provided in one embodiment of the present disclosure. Displayed on the homepage of the browser in the Figure are quick navigation items, i.e., quick icons, for "weather", "calendar", etc which have already been added.

User may operate the add button displayed on the homepage of the browser to produce an add request for adding a quick navigation item for the preset webpage file.

Step 203, after receiving the add request, acquiring the file save path of the preset webpage file stored in the electronic device.

As known from step 201, in the process of installing the browser, the preset webpage file has already been stored in the electronic device. Therefore, after the browser receives the add request, the file save path of the preset webpage file stored in the electronic device may be acquired.

Step 204, adding a quick navigation item in the browser such that the quick navigation item correspond to the file save path of the preset webpage file, the quick navigation item may be one of icon, label, bookmark, menu item, button and hyperlink.

After the add request is received, the quick navigation item added in the browser should usually correspond to the file save path of the preset webpage file. Specifically, when implementing the disclosure, a plurality of quick navigation items may be set in the browser, such as a quick navigation item for weather, a quick navigation item for calendar, or a quick navigation item for microblog, etc. In order to differentiate link paths specified by each quick navigation item, each quick navigation item should correspond to its link path. That is to say, in order to be differentiated from other quick navigation items, the quick navigation item added herein should correspond to the file save path of the preset webpage file.

Step 205, displaying a quick navigation item on the browser, the quick navigation item corresponding to the file save path of a preset webpage file stored in the electronic device.

Refer to FIG. 3, which shows a schematic diagram of a browser which can display quick navigation items provided in one embodiment of the present disclosure.

The quick navigation items shown in FIG. 3 are quick icons set on the homepage of the browser. When it is determined to add a quick navigation item to the browser, the quick navigation item will be added at a predetermined position of the browser. For example, the preset webpage file added in FIG. 3 can be regarded as a quick navigation item for opening a preset webpage file.

In addition to the quick navigation items appearing in the form of icons as shown in FIG. 3, quick navigation items may also be displayed in the browser in the form of label, bookmark, menu item, button and hyper link, etc.

Generally, in order to make sure that operating a quick navigation item may result in display of a corresponding preset webpage file, the quick navigation item is usually corresponding to the file save path of the preset webpage file. Typically, if a quick navigation item is corresponding to a webpage address carrying http (hypertext transfer protocol) therein, when a user acts on the quick navigation item, the browser will find the server corresponding to the webpage address based on http and display in the browser the contents of the webpage address in the server. As to the file save path of the preset webpage file herein, since the preset webpage file is stored on the file save path in the electronic device, the preset webpage file can be directly opened according to the file save path without the help of http.

Step 206, receiving a trigger signal acting on the quick navigation item.

When a user acts on the quick navigation item displayed on the browser in the form of pressing a button or touching a screen, the browser can receive a trigger signal acting on the quick navigation item.

Obviously, the trigger signal received here should contain identification information of the quick navigation item, according to which, the browser will get to know which quick navigation item is triggered.

Step 207, after receiving the trigger signal, opening the preset webpage file according to the file save path corresponding to the quick navigation item, the preset webpage file containing an editable region.

Since the quick navigation item corresponds to the file save path of the preset webpage file, the preset webpage file can be opened via the file save path corresponding to the quick navigation item.

Specifically, when implementing the disclosure, the preset webpage file may be a webpage file constructed in HTML (Hyper Text Markup Language) or other languages which can be parsed into a webpage by the browser. For example, when the preset webpage file is a file constructed in HTML5, an editable region in the preset webpage file can be set by means of label "contenteditable" in HTML5. For example, setting the value of "contenteditable" to be true means that the region defined by "contenteditable" is editable.

Step 208, recording information in the editable region of the preset webpage file opened.

The user may input information in the editable region of the preset webpage file opened. Accordingly, the browser may receive the information input by the user in the editable region of the preset webpage file opened, and save the received information in the preset webpage file, so that the information input this time can be viewed when the preset webpage file is opened next time.

Figure 4A:
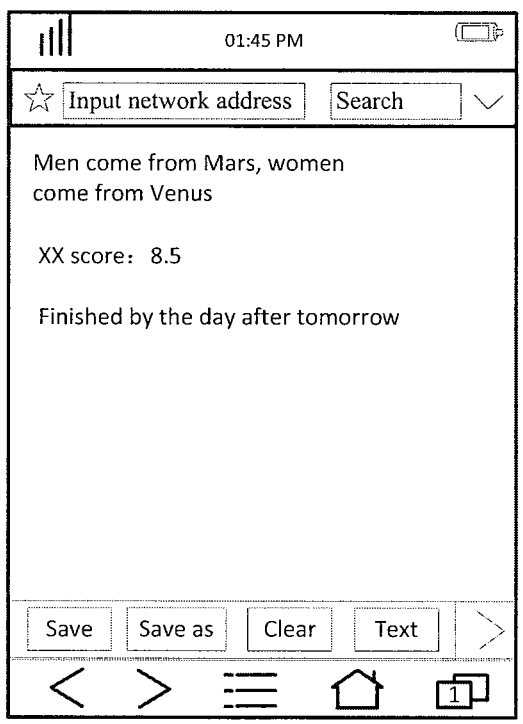
FIG. 4A is a schematic diagram of a preset webpage file opened in a browser in one embodiment of the present disclosure.

In addition to the editable region, the preset webpage file may also contain buttons such as save, save as, clear, text, etc. Refer to FIG. 4A, which shows a schematic diagram of a preset webpage file opened in a browser in one embodiment of the present disclosure. By selecting buttons such as save, save as, clear, text, etc displayed in the preset webpage file, the user can edit corresponding contents of the preset webpage file. For example, the user may select "save" button to save the preset webpage file, select "clear" button to clear the information in the editable region of the preset webpage file, or select "text" button to change the font, color, size and the like of the information in the editable region of the preset webpage file.

Specifically, when implementing the disclosure, buttons such as save, save as, clear, text, etc in the preset webpage file can be set at the bottom of the preset webpage file or other places of the preset webpage file. Moreover, in addition to the editable region and plural buttons as described above, the preset webpage file may further contain other contents such as pictures, buttons with other functions, etc, which are not described in detail any more herein.

Figure 4B:
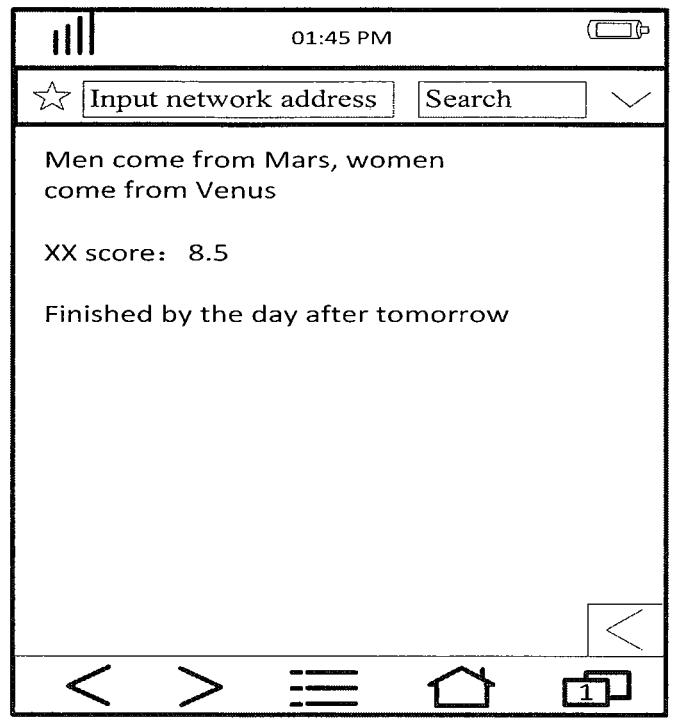
FIG. 4B is a schematic diagram of a preset webpage file opened in a browser in another embodiment of the present disclosure.

In a preferred embodiment, in order to prevent user's misoperation of buttons such as save, save as, clear, text, etc displayed when inputting information in the preset webpage file, these buttons can be hidden temporarily, for example, by a hide/display button, referring to FIG. 4B which shows a schematic diagram of a preset webpage file opened in a browser in another embodiment of the present disclosure. Accordingly, if the user wants to display these buttons, he/she can display these buttons that require displaying by the hide/display button. Obviously, the hide/display button set herein may be one button or two buttons which have hide function and display function, respectively. Indeed, since the screen of the electronic device have limited width and height, if there are too many buttons to be displayed in the preset webpage file, they cannot be displayed at a predetermined position (e.g., at the bottom of the preset webpage) of the preset webpage file all at once. In that case, extra buttons that require displaying can be pulled via a slide operation or a selection pulling button.

Specifically, when implementing the disclosure, the user may further save the information in the editable region of the preset webpage file into a text document as necessary. For example, the user may act on the "save as" button of the preset webpage file, i.e., the browser may receive a save request for saving the information in the editable region of the preset webpage file as a text document. After receiving the save request, the information in the editable region of the preset webpage file can be saved as a text document, and the text document can be stored in the electronic device.

From the above, with the information recording method provided by the embodiment of the present disclosure, a preset webpage file in an installation package is stored to a predefined file save path when installing a browser, and when notes need to be made by means of the preset webpage file, only the preset webpage file needs to be opened via the file save path, and then a user can record information in the preset webpage file. Since the preset webpage file does not need to be logged into by connecting to a server via a network, notes can be made by means of the preset webpage file even in the state of offline, and when a great quantity of contents are recorded in the preset webpage file, time and traffic can be saved to a large extent.

Figure 5:
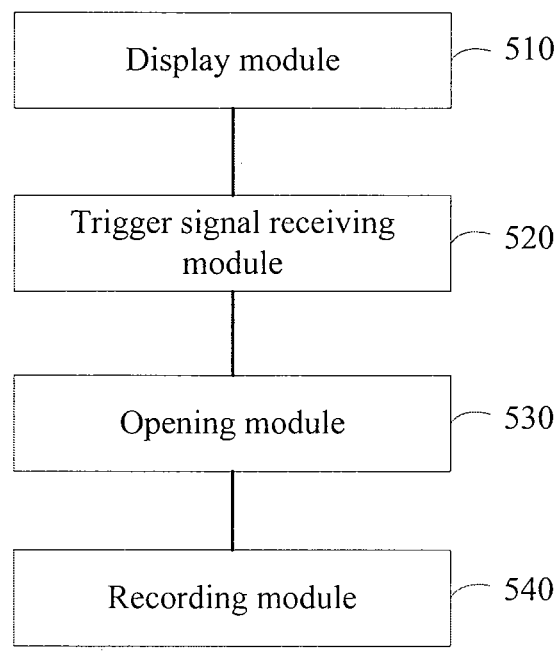
FIG. 5 is a block diagram of the information recording apparatus provided by yet another embodiment of the present disclosure.

Refer to FIG. 5, which shows a block diagram of the information recording apparatus provided by yet another embodiment of the present disclosure. The information recording apparatus may be implemented as an electronic device containing a browser or a part thereof. The information recording apparatus may also be implemented as a browser or a part thereof. The information recording apparatus may include: a display module 510, a trigger signal receiving module 520, an opening module 530, and a recording module 540.

The display module 510 is adapted for displaying a quick navigation item on the browser, the quick navigation item corresponding to a file save path of a preset webpage file stored in the electronic device.

The trigger signal receiving module 520 is adapted for receiving a trigger signal acting on the quick navigation item displayed by the display module 510.

The opening module 530 is adapted for opening the preset webpage file according to the file save path corresponding to the quick navigation item displayed after the trigger signal receiving module 520 receives the trigger signal, the preset webpage file containing an editable region.

The recording module 540 is adapted for recording information in the editable region of the preset webpage file opened by the opening module 530.

From the above, with the information recording apparatus provided by the embodiment of the present disclosure, by only opening a corresponding preset webpage file by means of the quick navigation item corresponding to the file save path, a user can record information in the preset webpage file. Since the preset webpage file does not need to be logged into by connecting to a server via a network, notes can be made by means of the preset webpage file even in the state of offline, and when a great quantity of contents are recorded in the preset webpage file, time and traffic can be saved to a large extent.

Figure 6:
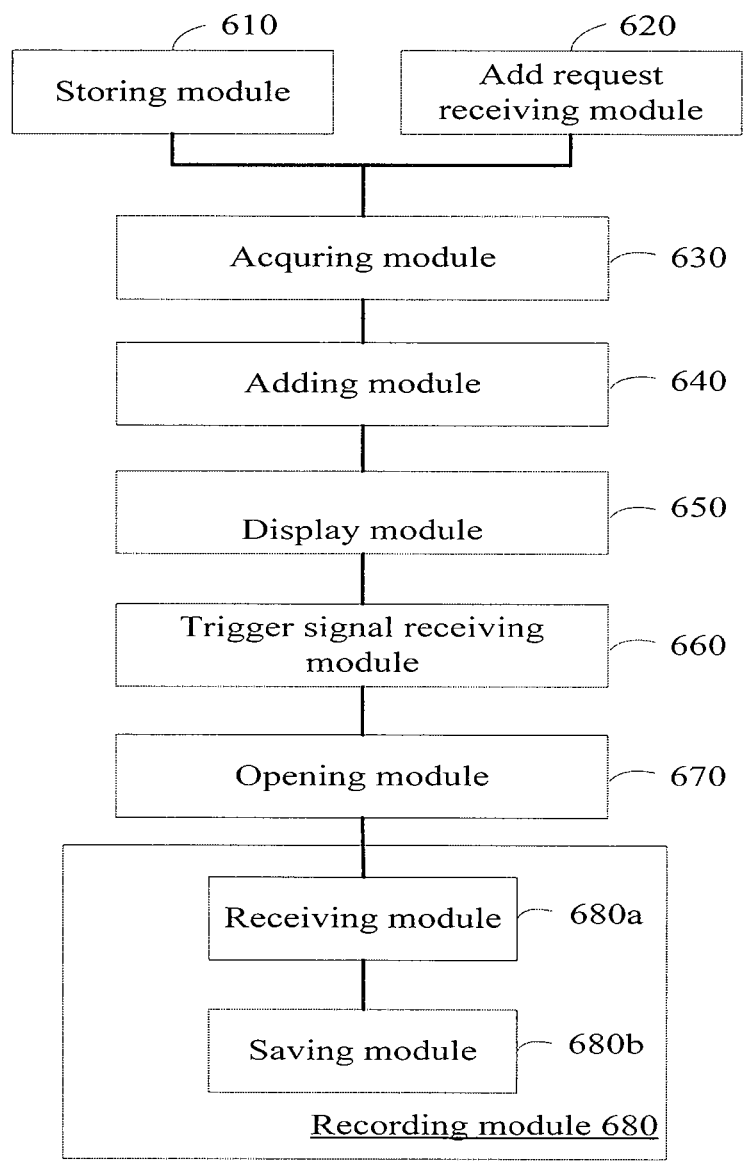
FIG. 6 is a block diagram of the information recording apparatus provided by a further embodiment of the present disclosure.

Refer to FIG. 6, which shows a block diagram of the information recording apparatus provided by a further embodiment of the present disclosure. The information recording apparatus may be implemented as an electronic device containing a browser or a part thereof. The information recording apparatus may also be implemented as a browser or a part thereof. The information recording apparatus includes: a storing module 610, an add request receiving module 620, an acquiring module 630, an adding module 640, a display module 650, a trigger signal receiving module 660, an opening module 670, and a recording module 680.

The storing module 610 is adapted for storing a preset webpage file carried in a browser installation package to a predefined file save path when installing the browser, the predefined file save path being a default install path or a user-specified path.

The add request receiving module 620 is adapted for receiving an add request for adding a quick navigation item.

The acquiring module 630 is adapted for acquiring the file save path of the preset webpage file stored in the electronic device by the storing module 610 after the add request receiving module 620 receives the add request.

The adding module 640 is adapted for adding a quick navigation item in the browser such that the quick navigation item correspond to the file save path of the preset webpage file acquired by the acquiring module 630, the quick navigation item being one of icon, label, bookmark, menu item, button and hyperlink.

The display module 650 is adapted for displaying the quick navigation item added by the adding module 640 on the browser, the quick navigation item corresponding to the file save path of a preset webpage file stored in the electronic device.

The trigger signal receiving module 660 is adapted for receiving a trigger signal acting on the quick navigation item displayed by the display module 650.

The opening module 670 is adapted for opening the preset webpage file according to the file save path corresponding to the quick navigation item after the trigger signal receiving module 660 receives the trigger signal, the preset webpage file containing an editable region.

The recording module 680 is adapted for recording information in the editable region of the preset webpage file opened by the opening module 670.

The recording module 680 may include a receiving unit 680a and a saving unit 680b.

The receiving unit 680a is adapted for receiving information in the editable region of the preset webpage file opened by the opening module 670.

The saving unit 680b is adapted for saving the information received by the receiving unit 680a in the preset webpage file.

In a preferred embodiment, the information recording apparatus may further include a save request receiving module and a saving module.

The save request receiving module is adapted for receiving a save request for saving the information recorded in the editable region of the preset webpage file by the recording module as a text document.

The saving module is adapted for saving the information in the editable region of the preset webpage file as a text document and storing the text document in the electronic device after the save request receiving module receives the save request.

From the above, with the information recording apparatus provided by the embodiment of the present disclosure, a preset webpage file in an installation package is stored to a predefined file save path when installing a browser, and when notes need to be made by means of the preset webpage file, only the preset webpage file needs to be opened via the file save path, and then a user can record information in the preset webpage file. Since the preset webpage file does not need to be logged into by connecting to a server via a network, notes can be made by means of the preset webpage file even in the state of offline, and when a great quantity of contents are recorded in the preset webpage file, time and traffic can be saved to a large extent.

It is important to note that, when the information recording apparatus provided by the above embodiment records information, division of the functional modules mentioned above are described only for illustration. In practical applications, the above functions can be allocated to different functional modules to be accomplished as necessary; that is to say, the internal structure of the browser can be divided into different functional modules to accomplish all or part of the functions described above. Moreover, the information recording method and information recording apparatus provided by the above embodiments belong to the same idea, the detailed implementation of which can be obtained by referencing to the method embodiment and therefore is omitted herein.

The numbering of the above embodiments of the disclosure is only for illustration, and does not represent which one is better.

As will also be understood by those ordinary skilled in the art, all or part of the steps of the above embodiments can be accomplished either by hardware or by instructing relative hardware via a program, which can be stored in computer readable storing medium including ROM/RAM, magnetic disk, optical disk, and so on.

Described above are merely preferred embodiments of the present disclosure, which are not intended to limit the disclosure. As long as consistent with the spirit and principle of the disclosure, any equivalent modification, substitution or improvement, etc. will fall within the scope of protection of the disclosure.

What is claimed is:

1. An information recording method, which is applied in an electronic device containing a browser and characterized in that, the information recording method includes:
    storing a preset webpage file carried in a browser installation package to a file save path of the electronic device when installing the browser, the file save path being a default install path or a user-specified path, wherein the preset webpage file is configured to display a local depiction of an interactive web page while the browser is in an offline state without connection to a server hosting the interactive web page;
    adding a bookmark quick navigation item in the browser, wherein the bookmark quick navigation item is configured to, when triggered, identify a bookmarked webpage;
    receiving an add request for adding a preset webpage quick navigation item, wherein the add request indicates interaction with an interactive icon included in a homepage presented via the browser;
    after receiving the add request, acquiring the file save path of the preset webpage file stored in the electronic device;
    adding the preset webpage quick navigation item in the browser, wherein the preset webpage quick navigation item corresponds to the file save path of the preset webpage file stored in the electronic device, and wherein the preset webpage quick navigation item is configured to be presented for inclusion as an interactive icon in the homepage of the browser;
    displaying the interactive icon in the homepage of the browser;
    receiving a trigger signal indicating selection of the interactive icon displayed in the homepage of the browser while the browser is in the offline state;
    executing, by the browser, the preset webpage file to display the local depiction of the interactive web page within the browser while the browser is in the offline state, wherein the local depiction of the interactive web page includes an editable region configured to receive information input by a user;
    receiving information input by the user into the editable region; and
    saving the received information in the preset webpage file stored on the electronic device.

2. The information recording method according to claim 1, further including, after receiving the information in the editable region:
    receiving a save request for saving the received information as a text document; and
    saving the received information as a text document and storing the text document in the electronic device.

3. An information recording apparatus, included in an electronic device configured to run a browser. and characterized in that the information recording apparatus includes a processor and a memory storing program codes, wherein the processor is configured to execute the program codes to:
    store a preset webpage file carried in a browser installation package to a file save path when installing the browser, the file save path being a default install path or a user-specified path, wherein the preset webpage file is configured to display a local depiction of an interactive web page while the browser is in an offline state without connection to a server hosting the interactive web page;
    receive an add request for adding a preset webpage quick navigation item, wherein the add request indicates interaction with an interactive icon included in a homepage presented via the browser;
    acquire the file save path of the preset webpage file stored in the electronic device after receiving the add request;
    add the preset webpage quick navigation item in the browser, wherein the preset webpage quick navigation item corresponds to the file save path of the preset webpage file stored in the electronic device, and wherein the preset webpage quick navigation item is configured to be presented for inclusion as an interactive icon in the homepage of the browser;
    display the interactive icon in the homepage of the browser;
    receive a trigger signal indicating selection of the interactive icon displayed in the homepage of the browser while the browser is in the offline state;
    executing, by the browser, the preset webpage file to display the local depiction of the interactive web page within the browser while the browser is in the offline state, wherein the local depiction of the interactive web page includes an editable region configured to receive information input by a user;
    receive information input by the user into the editable region; and
    save the received information in the preset webpage file stored on the electronic device.

4. The information recording apparatus according to claim 3, wherein the processor is further configured to execute the program codes to:
    receive a save request for saving the received information as a text document; and
    save the received information as a text document and store the text document in the electronic device.

5. A non-transitory computer-readable storage medium storing one or more sequences of instructions which, when executed by one or more processors, cause the one or more processors to:
    store a preset webpage file carried in a browser installation package to a file save path when installing the browser, the file save path being a default install path or a user-specified path, wherein the preset webpage file is configured to display a local depiction of an interactive web page while the browser is in an offline state without connection to a server hosting the interactive web page;

receive an add request for adding a preset webpage quick navigation item, wherein the add request indicates interaction with an interactive icon included in a homepage presented via the browser;

acquire the file save path of the preset webpage file stored in the electronic device after receiving the add request;

add the preset webpage quick navigation item in the browser, wherein the preset webpage quick navigation item corresponds to the file save path of the preset webpage file stored in the electronic device, and wherein the preset webpage quick navigation item is configured to be presented for inclusion as an interactive icon in the homepage of the browser;

display the interactive icon in the homepage of the browser;

receive a trigger signal indicating selection of the interactive icon displayed in the homepage of the browser while the browser is in the offline state;

executing, by the browser, the preset webpage file to display the local depiction of the interactive web page within the browser while the browser is in the offline state, wherein the local depiction of the interactive web page includes an editable region configured to receive information input by a user;

receive information input by the user into the editable region; and save the received information in the preset webpage file stored on the electronic device.

\* \* \* \* \*